No. 768,069. PATENTED AUG. 23, 1904.
W. P. O'BRIEN.
SNAP HOOK.
APPLICATION FILED DEC. 14, 1903.
NO MODEL.
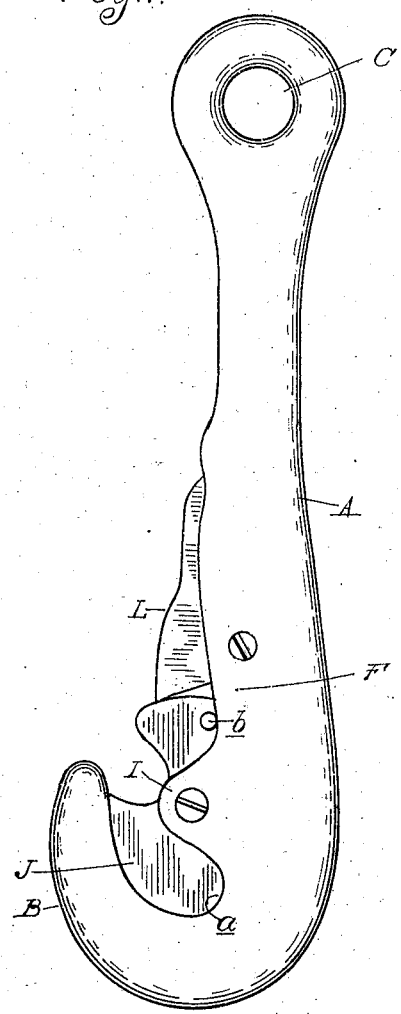
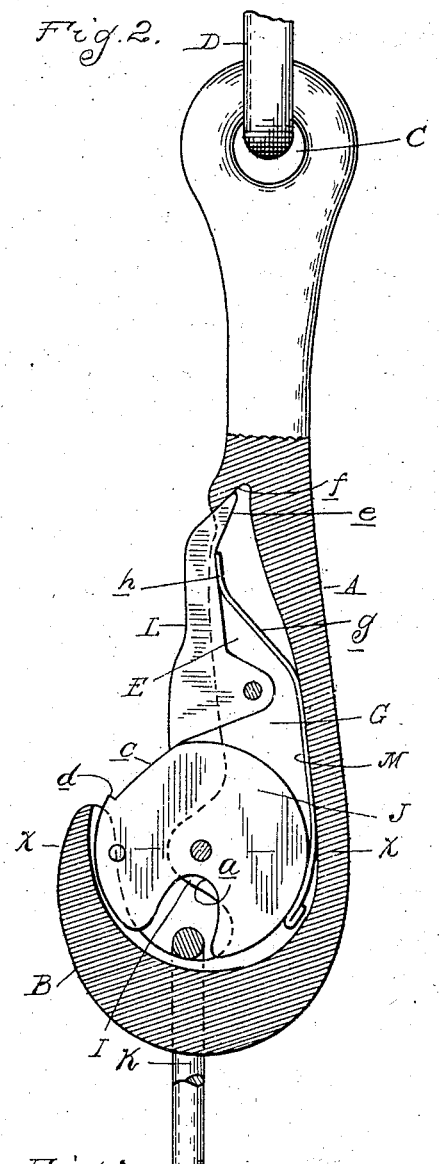
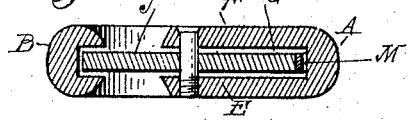
Witnesses
Geo. M. Graves
Jas. P. Barry
Inventor,
William P. O'Brien
By James Whittemore
Atty.

No. 768,069.

Patented August 23, 1904.

UNITED STATES PATENT OFFICE.

WILLIAM P. O'BRIEN, OF DETROIT, MICHIGAN.

SNAP-HOOK.

SPECIFICATION forming part of Letters Patent No. 768,069, dated August 23, 1904.

Application filed December 14, 1903. Serial No. 185,127. (No model.)

*To all whom it may concern:*

Be it known that I, WILLIAM P. O'BRIEN, a citizen of the United States, residing at Detroit, in the county of Wayne and State of Michigan, have invented certain new and useful Improvements in Snap-Hooks, of which the following is a specification, reference being had therein to the accompanying drawings.

The invention relates particularly to snap-hooks especially designed for use in connection with harness and like appliances; and it consists in the novel and peculiar construction of the hook and in the arrangement and combination of its various parts, as will be more fully hereinafter set forth, and pointed out in the claims.

In the drawings illustrating my invention, Figure 1 is a view in side elevation of the hook. Fig. 2 is a vertical central section therethrough, and Fig. 3 is a section taken on line $x\ x$, Fig. 2.

Reference-letter A represents the hook-body, terminating at one end in the beak or hook proper, B, and at the opposite end in an eye C, in which may be arranged the usual loop D, forming the connection between the hook and the harness. The body, as shown, is provided with two spaced flanges E and F, forming therebetween the chamber G, and at points in proximity to the hook portion B these flanges terminate in the oppositely-disposed apertured ears I.

J represents the disk arranged within the chamber described, pivoted between the ears of the hook-body, the arrangement of the parts being such that when the usual ring K is engaged with the hook the opening through which the ring is admitted is closed by the disk, so that no other portion of the harness can become engaged with the hook after the latter is once locked. The disk, as shown, is provided with the recess $a$ to receive the hook K and carries a stop pin or lug $b$ at a point a slight distance from the recess, which limits the forward and rearward movement of the disk. The periphery of the disk is slightly flattened, as at $c$, and is provided with a shoulder $d$, adapted to be engaged by the pivoted dog or pawl L. This dog, as shown, is pivoted between the flanges of the hook-body in a position to engage the shoulder $d$, and the opposite end $e$ of the dog is bent downwardly a slight distance, so as to engage an inclined bearing-face $f$, which limits the outward movement of the dog.

M represents a flat spring arranged within the chamber of the hook-body bearing at one end against the periphery of the disk J, acting as a drag therefor and having its opposite end extending upwardly, as at $g$, and carrying the transverse portion $h$, which abuts against the dog L, holding the latter normally in contact or engagement with the disk.

The hook being in the position as indicated in Fig. 1, the ring K is engaged within the recess $a$ of the disk and is drawn forwardly into the position indicated in Fig. 2. Upon the rotation of the disk the opening of the hook is closed for the purpose previously set forth, and the return movement of the disk to a position which would release the ring K is prevented by the spring-pressed dog. To release the ring, the operator by pressing upon the shank of the dog moves the latter from its engagement with the shoulder $d$ and the disk is returned.

What I claim as my invention is—

1. A snap-hook comprising a body having a recess or chamber extending longitudinally therein, and terminating at one end in a beak or hook proper, a recessed disk pivoted within the chamber beneath the hook, a pawl also pivoted within the body to engage the periphery of the disk, and a spring within the chamber or recess engaging both the disk and pawl.

2. A snap-hook comprising a body having a chamber formed longitudinally therein, and terminating at one end in the hook proper, a recessed disk pivoted within the chamber beneath the hook, a pawl pivoted within the body to engage the periphery of the disk, and a single flat spring arranged upon the floor of the chamber with its opposite ends in engagement with the pawl and the disk, substantially as and for the purpose set forth.

In testimony whereof I affix my signature in presence of two witnesses.

WILLIAM P. O'BRIEN.

Witnesses:
JAMES P. BARRY,
H. C. SMITH.